United States Patent [19]

Artz

[11] Patent Number: 5,292,175

[45] Date of Patent: Mar. 8, 1994

[54] INFLATABLE CHILD VEHICLE SEAT

[75] Inventor: Lawrence Artz, Wilton, Conn.

[73] Assignee: Babystar, Brooklyn, N.Y.

[21] Appl. No.: 939,521

[22] Filed: Sep. 4, 1992

[51] Int. Cl.⁵ ............................................. B60N 2/28
[52] U.S. Cl. ............................ 297/250.1; 297/452.41; 297/DIG. 3
[58] Field of Search ................. 297/250, DIG. 3, 484, 297/467, 468, 454, 250.1, 452.41

[56] References Cited

U.S. PATENT DOCUMENTS

| D. 315,255 | 3/1991 | Beermann | D6/356 |
|---|---|---|---|
| 1,027,764 | 5/1912 | Rilleau . | |
| 2,136,510 | 11/1938 | Jensen . | |
| 2,437,602 | 3/1948 | Hann . | |
| 3,220,769 | 11/1965 | Regan . | |
| 3,265,438 | 8/1966 | Regan | 297/380 |
| 3,606,457 | 9/1969 | Reay | 297/488 |
| 3,635,528 | 1/1972 | Strom | 297/456 |
| 3,712,674 | 1/1973 | Ando | 297/456 |
| 3,791,694 | 2/1974 | Roberts et al. | 297/250 |
| 4,040,655 | 8/1977 | Garrick et al. | 296/63 |
| 4,402,548 | 9/1983 | Mason | 297/250 |
| 4,425,688 | 1/1984 | Anthony et al. | 24/656 |
| 4,547,919 | 10/1985 | Wang | 5/455 |
| 4,579,385 | 4/1986 | Koenig | 297/184 |
| 4,583,253 | 4/1986 | Hall | 5/94 |
| 4,592,588 | 6/1986 | Iscno et al. | 297/DIG. 3 |
| 4,617,705 | 10/1986 | Anthony et al. | 24/642 |
| 4,627,659 | 12/1986 | Hall | 297/DIG. 3 |
| 4,687,452 | 8/1987 | Hull | 297/250 |
| 4,711,490 | 12/1987 | Brand | 297/DIG. 3 |
| 4,774,735 | 10/1988 | Sanderson et al. | 297/DIG. 3 |
| 4,836,605 | 1/1989 | Greenwood et al. | 297/DIG. 3 |
| 5,005,902 | 4/1991 | Farnworth et al. | 297/DIG. 3 |
| 5,029,928 | 7/1991 | Huber | 297/DIG. 3 |
| 5,156,436 | 10/1992 | Grene | 297/250 |

FOREIGN PATENT DOCUMENTS 1078724  6/1980  Canada .......................... 297/DIG. 3

Primary Examiner—Alexander Grosz
Attorney, Agent, or Firm—Amster, Rothstein & Ebenstein

[57] ABSTRACT

A child seat device, for use in a vehicle having a seatbelt for securing the child seat device to the vehicle seat, has an inflatable child seat which includes an inflatable bottom panel, an inflatable back panel upstanding from the rear of the bottom panel, and a pair of opposed, laterally spaced inflatable sidewall panels. Each of the sidewall panels has a back portion projecting forwardly from a respective side of the back panel and a bottom portion projecting upwardly from a respective side of the bottom panel. An inflatable brace, disposed in each of the sidewall panels intermediate the back and bottom sidewall portions, limits pivotal movement of the back and bottom sidewall portions towards each other. Each of the braces defines a single interior air chamber having at most limited gaseous communication with the bottom, back and sidewall panels. A releasable harness maintains the torso of a child intermediate the sidewall panels.

21 Claims, 12 Drawing Sheets

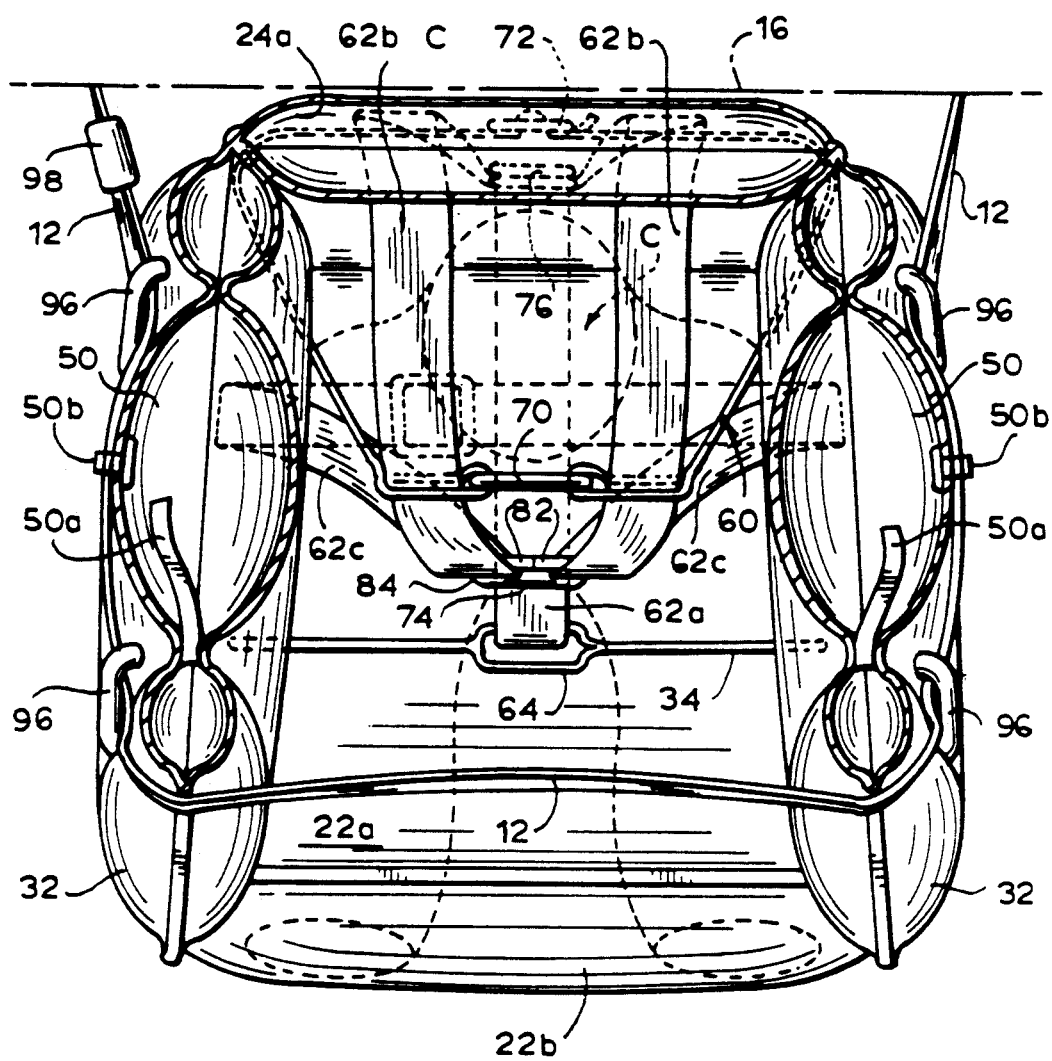
F I G. 10

INFLATABLE CHILD VEHICLE SEAT

BACKGROUND OF THE INVENTION

The present invention relates to a vehicle seat for children, and more particularly, to such a seat which is inflatable and deflatable.

Child vehicle seats are well known in the art and are designed to accommodate and protect a child sitting in a vehicle. The seat is disposed parallel to the motion of the vehicle—that is, it is mounted on the car seat extending along a longitudinal axis of the vehicle. Preferably, a child seat (as opposed to an infant seat) is configured so that the child faces forwardly toward the front end of the vehicle.

Conventional child vehicle seats are formed of cushioning or padded material, either with or without a rigid frame for supporting the same. Such a seat represents a compromise between the high level of protection desirably afforded to the child in the event of an accident, and the high level of comfort desirably provided for the child during normal use of the seat (that is, when no accident is imminent). Such a seat fails to provide the child with the highest level of protection possible in the event of an accident because the structure necessary to provide the highest level of protection would be uncomfortable for the child during normal use of the seat.

Another problem with the conventional child vehicle seats is that they are bulky and heavy and thus difficult to store where storage space is at a premium. Thus, while parents may provide their vehicle with a child vehicle seat, when the child is taken for rides in the vehicles of those who do not have a child vehicle seat, the child is deprived of the extra protection afforded by a child vehicle seat. For example, grandparents who only see the child occasionally will probably not have such a seat in their vehicle as a routine matter and may not have room for storage of such a device within their home.

Accordingly, it is an object of the present invention to provide a child vehicle seat device which, under normal driving conditions, provides a maximum level of comfort to the child within, yet, in the event of an accident, affords a maximum level of protection for the child within, regardless of its comfort, during the instant of the accident.

Another object is to provide such a device which is easily and compactly stored when not in use.

A further object is to provide such a device which is economical to manufacture and easy to maintain.

A still further object is to provide such a device which is light in weight.

SUMMARY OF THE INVENTION

It has been found that the above and related objects of the present invention are obtained in a child seat device for use in a vehicle having a seatbelt for securing the child seat device to the vehicle seat. The device comprises an inflatable child seat including an inflatable bottom panel, an inflatable back panel upstanding from the rear of the bottom panels, and a pair of opposed, laterally spaced inflatable sidewall panels. Each of the sidewall panels has a back portion projecting forwardly from a respective side of the back panel and a bottom portion projecting upwardly from a respective side of the bottom panel. The seat further includes bracing means, disposed in each of the sidewall panels intermediate the back and bottom sidewall portions, for limiting pivotal movement of the back and bottom sidewall portions towards each other, each of the bracing means preferably being inflatable and defining a single interior air chamber having at most limited gaseous communication with the bottom, back and sidewall panels. The device also includes releasable harness means for maintaining the torso of a child intermediate the sidewall panels.

In a preferred embodiment, at least an upper portion of the back panel is forcibly pivotable downward and forwards, but the bracing means limit pivotal movement of the back and bottom panels towards each other. The bottom, back and sidewall panels define together a single interior panel air chamber, and each of the bracing means air chambers, once inflated, is independent of the panel air chamber. The bottom, back and sidewall panels and the bracing means are commonly inflatable. The bottom, back and sidewall panels are commonly deflatable, and the bracing means are deflatable independently of each other and the panels.

The present invention further encompasses a child seat device for use in a vehicle having a seatbelt for securing the child seat device to the vehicle seat. The device comprises an inflatable child seat including an inflatable bottom panel defining an aperture therethrough, an inflatable back panel upstanding from the rear of the bottom panel and defining an aperture therethrough, and a pair of opposed, laterally spaced inflatable sidewall panels. Each of the sidewall panels has a back portion projecting forwardly from a respective side of the back panel and a bottom portion projecting upwardly from a respective side of the bottom panel. The device also comprises a continuous harness system including first releasable strap means for maintaining the upper torso of a child in the inflatable child seat intermediate the back sidewall portions, and second releasable strap means extending through both the back panel aperture and the bottom panel aperture and passing intermediate the legs of the child for maintaining the lower torso of the child intermediate the bottom sidewall portions. The first and second strap means are secured together at at least one point.

In a preferred embodiment, the harness system includes first strap means extending in a horizontal plane around the back panel intermediate the back and back sidewall panels, thereby to encircle the upper torso of a child in the inflatable child seat, and first fixture means for releasably fastening two portions of the first strap means together across the chest of the child. It further includes second strap means and second fixture means for releasably fastening two portions of the second strap means together between the legs of the child. The second strap means extends at least in a vertical plane from the second fixture means downwardly through the bottom panel aperture, then forwardly through the at least one back panel aperture, and into the second fixture means, thereby to maintain the lower torso of the child in the inflatable child seat. The first and second strap means are fixedly secured together at at least one point.

Preferably, the second strap means extends from the second fixture means downwardly through the bottom panel aperture, rearwardly and around the intersection of the bottom and back panels, upwardly and then forwardly through the at least one back panel aperture, and downwardly into the second fixture means. Optimally, a portion of the second strap means extends vertically around the bottom panel and intermediate the bottom and bottom sidewall panels and through the second fixture means, thereby to assist in maintaining the lower torso of the child intermediate the sidewall panels.

The inflatable child seat optimally defines a plurality of passageways for passage therethrough of the first and second strap means, thereby to maintain each of the first and second strap means in the desired orientation. The second strap means includes two lengths thereof extending from the second fixture means downwardly through the bottom panel aperture, then forwardly through the back panel aperture and downwardly into the second fixture means, each of the lengths of the second strap means being fixedly secured to a respective laterally spaced portion of the first strap means. The first and second strap means are fixedly secured together in front of the chest of a child in the inflatable child seat.

Optimally, each of the first and second strap means includes means for varying the effective length thereof independently of the other of the strap means, and each of the sidewall panels defines a passageway for passage therethrough of a vehicle seatbelt.

BRIEF DESCRIPTION OF THE DRAWING

The above and related objects, features and advantages of the present invention, will be more fully understood by reference to the following detailed description of the presently preferred, albeit illustrative, embodiments of the present invention when taken in conjunction with the accompanying drawing wherein:

FIG. 10 is a sectional view taken along the line 10—10 of FIG. 6;

DETAILED DESCRIPTION OF THE PREFERRED EMBODIMENTS

Figure 6:
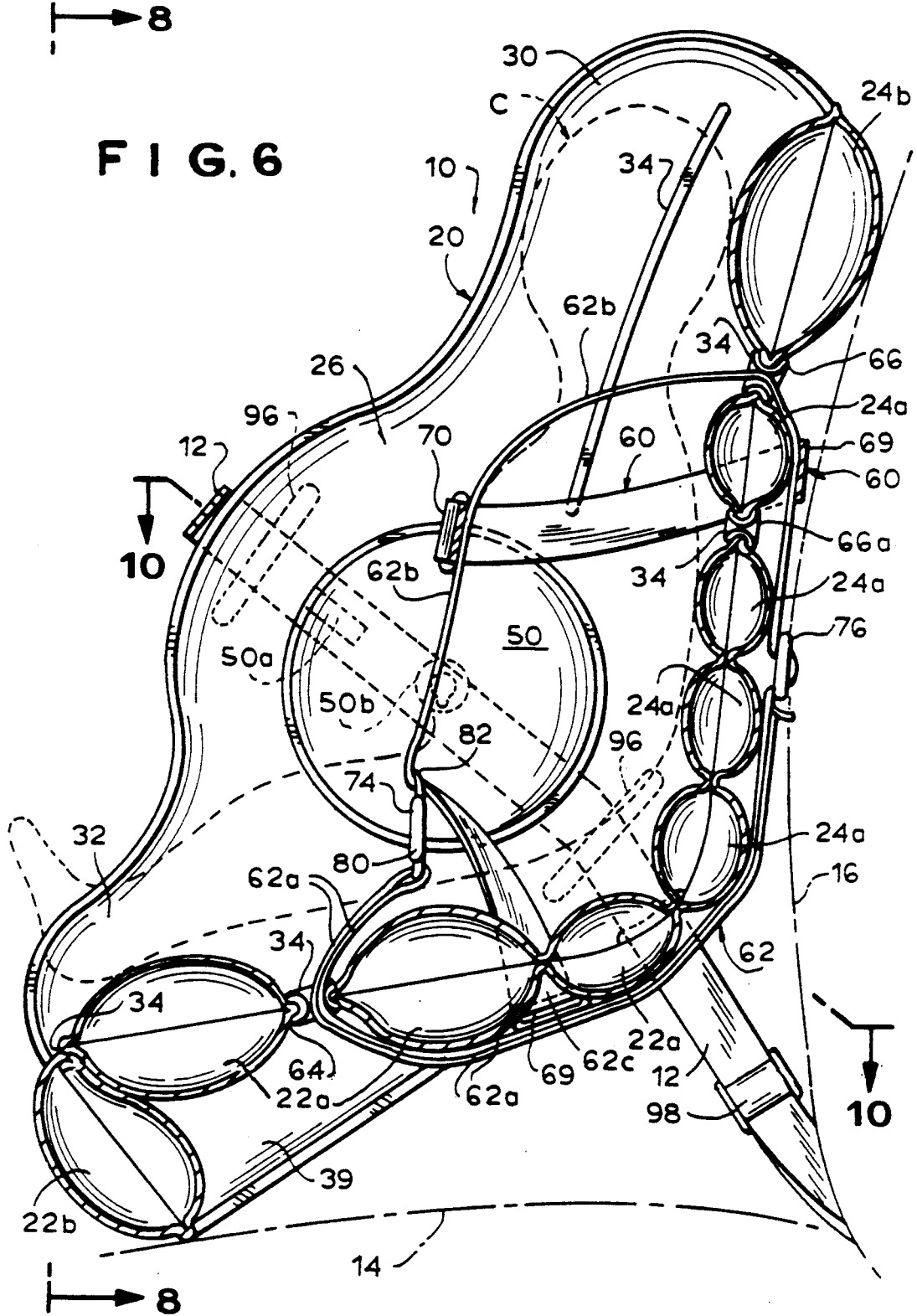
FIG. 6 is a sectional view thereof taken along the line 6—6 of FIG. 2 showing the device as secured to a vehicle seat by a seatbelt and a child (illustrated in phantom line) disposed therein.

Referring now to the drawing, and in particular to FIGS. 1-5 thereof, therein illustrated is a child seat device according to the present invention, generally designated by the reference numeral 10. As best seen in FIG. 6, the device 10 is intended for use in a vehicle (not shown) having a seatbelt 12 for securing the device 10 to the vehicle seat (illustrated in phantom line) formed by the generally horizontal bottom cushion 14 and the generally vertical back cushion 16.

More particularly, the device 10 comprises an inflatable child seat generally designated 20, including an inflatable bottom panel generally designated 22, an inflatable back panel generally designated 24 and upstanding from the rear of the bottom panel 22, and a pair of opposed, laterally spaced, inflatable sidewall panels generally designated 26. Each of the sidewall panels 26 has a back portion 30 projecting forwardly from a respective side of the back panel 24 and a bottom portion 32 projecting upwardly from a respective side of the bottom panel 22. The bottom, back and sidewall panels 22, 24, 26 define a single interior air chamber, as best seen in FIG. 6.

However, as illustrated, the bottom panel 22 is preferably subdivided into a series of three short, thick sub-chambers 22a and a fourth sub-chamber 22b, which depends downwardly from the front of the bottom panel 22, thereby to provide some support for the calves of the child in the seat 20. Similarly, as also illustrated, the back panel 24 is preferably divided into a series of three short, thick sub-chambers 24a and a single somewhat wider chamber 24b disposed at the top of the back panel 24. Each of the sub-chambers 22a, 22b of the bottom panel 22 are in gaseous communication, and each of the sub-chambers 24a, 24b of the back panel 24 are in gaseous communication. Furthermore, the sub-chamber 22a at the back of the bottom panel 22 and the sub-chamber adjacent 24a at the bottom of the back panel 24 are in gaseous communication, thereby ensuring that all of the sub-chambers, 22a, 22b, 24a, 24b are in gaseous communication. As the short, thick sub-chambers extending from one sidewall 26 to the other sidewall 26 are formed by well-known techniques, such as thermal or ultrasonic welding, the gaseous communication between sub-chambers is easily accomplished by limiting the length of the weld lines 34 so that they do not completely separate adjacent sub-chambers. Clearly the panels 22, 24 may be comprised of a greater or lesser number of sub-chambers. Preferably each sidewall panel 26 further defines a shaping skirt 39 connecting one side of depending sub-chamber 22b to the full length of the bottom panel 22.

The back and bottom sidewall portions 30, 32 are also in gaseous communication with each other through intermediate or communicating sidewall portions 26a. The sidewall panels 26 are secured to the bottom and back panels 22, 24 by weld lines 36, but the weld lines 36 do not extend the full length of the intersection of the panels 22, 24 with the sidewall panel 26, so that there is gaseous communication between the sidewall panels 26 and both the bottom and back panels 22, 24. Accordingly, a single inflation valve 40 disposed on one of the sidewall panels 26 (or one of the other panels) enables common inflation and deflation of the bottom, back and sidewall panels 22, 24 and 26 (including the various sub-chambers 22a, 22b, 24a, 24b).

The back panel 24 is substantially longer than the bottom panel 22 (that is, the back panel 24 extends vertically a distance greater than the distance the bottom panel 22 extends forwardly), and there is a tendency for at least the upper portion of the back panel 24 to be forcibly displaced forwardly and downwardly (towards the bottom panel 22) when a vehicle makes an abrupt stop. This type of forward and downward movement of the upper portion of back panel 24 compresses the child within the seat 20, and can apply undesirable forces to the sensitive area of the child's neck. In a conventional child seat having a rigid frame, the frame is designed to withstand this collapsing motion. Even in a conventional child seat without a frame, the padding or cushion material of which the sidewall panels are formed limits the amount of collapsing movement that can occur since the distribution of the cushion material within the seat is substantially fixed and the cushioning material is compressible to only a limited degree. On the other hand, in an inflatable child seat, the air is highly compressible and capable of relocating throughout the seat as necessary, so that this collapsing movement poses a real problem.

Accordingly, in order to overcome this collapsing motion, the present invention provides a bracing means 50, disposed in each of the sidewall panels 26 intermediate the back and bottom sidewall portions 30, 32, for limiting pivotal movement of the back and bottom sidewall portions 30, 32 towards each other and hence pivotal movement of the back and bottom panels 24, 22 towards each other. Preferably, as illustrated, each of the bracing means 50 is inflatable and defines a single interior air chamber having at most limited gaseous communication with the common panel air chamber of the bottom, back and sidewall panels 22, 24 and 26. When inflated, each bracing means 50 is in the form of a cylinder, preferably with hemispherical ends. As illustrated, each bracing means 50 has a cylindrical cross section with semi-spherical ends extending inwardly from the sidewall panel 26 toward the child at one end and outwardly from the sidewall panel 26 at the other end. Other regular geometric shapes may be employed, but preferably the bracing means 50 occupies a substantial portion of the intersection of the back and bottom sidewall portions 30, 32 without, however, interfering with gaseous communication therebetween via the intermediate sidewall panel portions 26a. If desired, a non-inflatable bracing means may be employed instead of the inflatable bracing means—e.g., a rigid metal or plastic member disposed intermediate the back and bottom sidewall portions to preclude buckling. In this case the rigid bracing means should be small enough that it does not interfere with the compact folding of the deflated seat 20.

As noted, the bracing means 50 has, at most, limited gaseous communication with the panels 22, 24, 26. In the preferred embodiment illustrated in FIG. 6, a one-way inflation-only valve 50a extends from each sidewall panel 26 into its respective bracing means 50 to permit the bracing means 50 to be commonly inflated with the bottom, back and sidewall panels 22, 24, 26. Valve 50a is shown as a collapsible valve which is open only when the air pressure in the sidewall panel 26 is greater than the pressure within the bracing means 50; the air pressure "opens" the collapsible valve 50a so that, under the pressure differential, air passes from the sidewall panel 26 into the bracing means 50. However, once the pressure within the bracing means 50 is as high as the pressure within the sidewall panel 26, this pressure collapses and "closes" the valve 50a and thereby terminates gaseous communication between the sidewall panel 26 and the bracing means 50 until the sidewall panel pressure again exceeds the bracing means pressure. Such collapsible one-way inflation-only valves are well known in the inflatable arts.

As the panels are being inflated via the panel valve 40, the bracing means 50 is inflated to a similar pressure. Once inflated, however, the bracing means air chamber is essentially independent of the panel air chambers due to collapse of the valve 50a. Thus, while the back, bottom and sidewall panels 22, 24, 26 are commonly deflatable via the valve 40, the bracing means 50 are not deflatable via the valve 40. Instead they are deflatable only via their own deflation valves 50b, independently of each other and of the panels. If desired, the one-way inflation-only collapsible valve 50a and the one-way deflation-only valve 50b may be dispensed with, and each bracing means 50 may be inflatable and deflatable only via its own two-way inflation/deflation valve.

Figure 1:
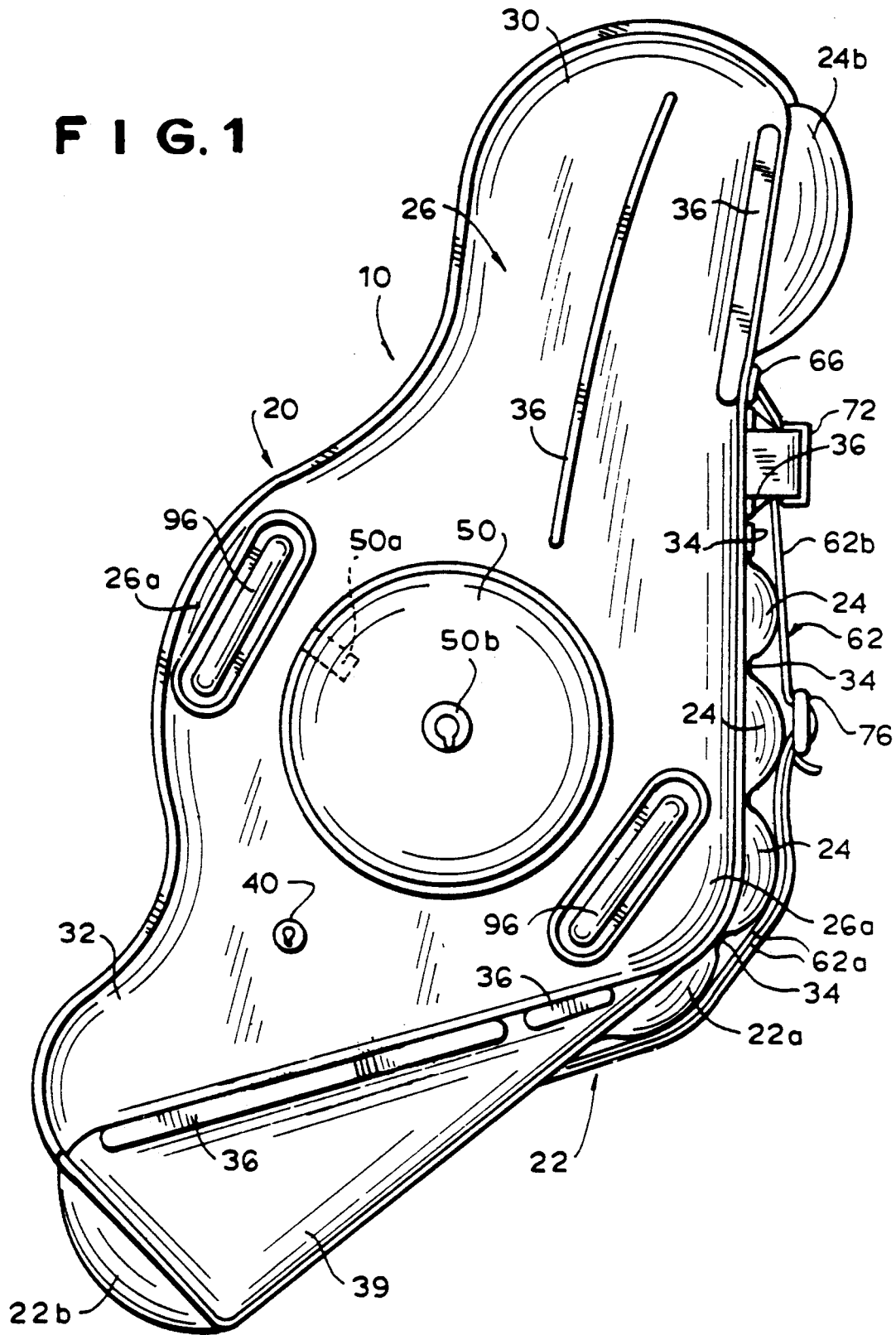
FIGS. 1, 2 and 3 are side elevational, top plan and bottom plan views, respectively, of a child seat device according to the present invention.
Figure 2:
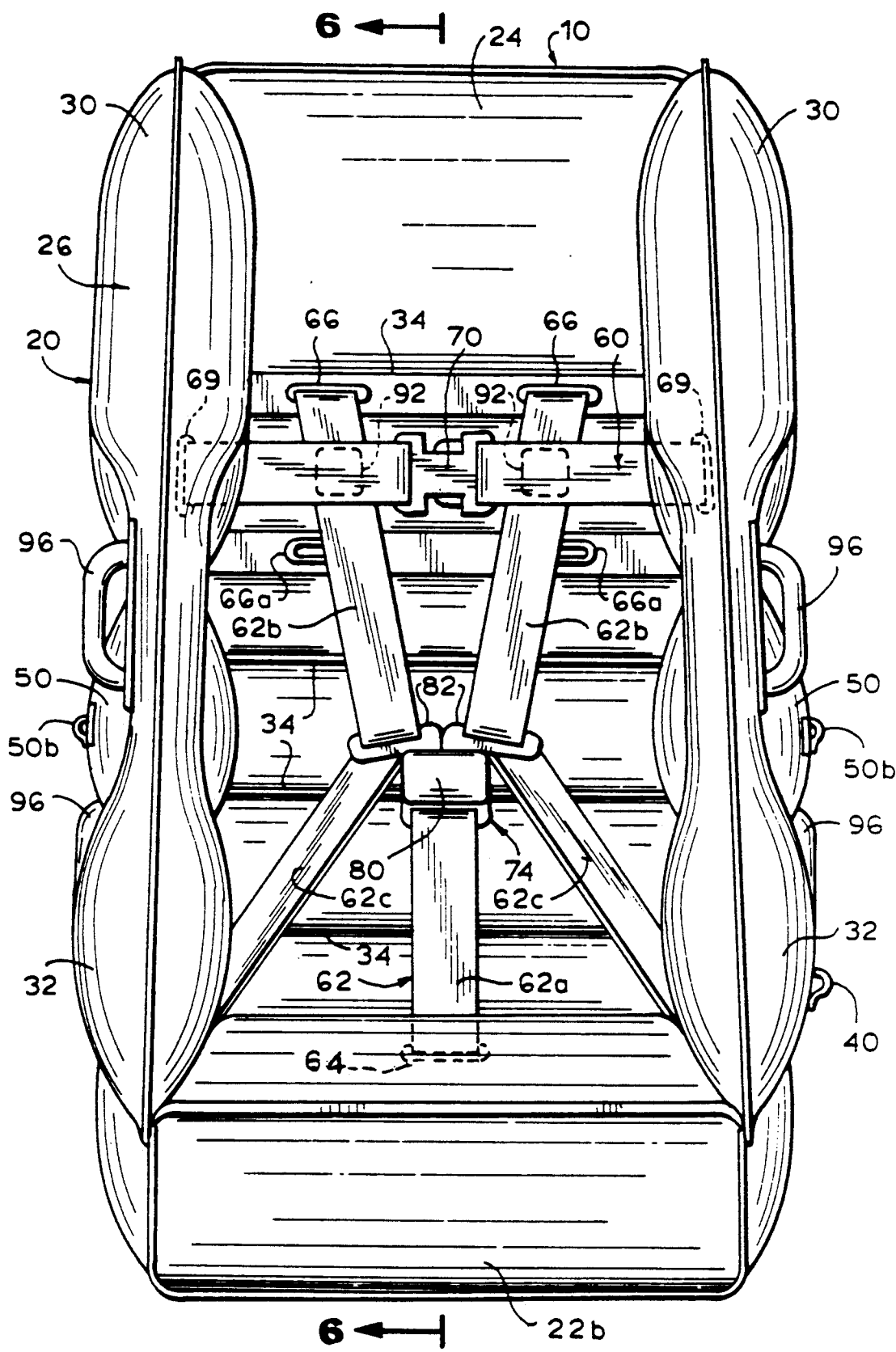
Figure 3:
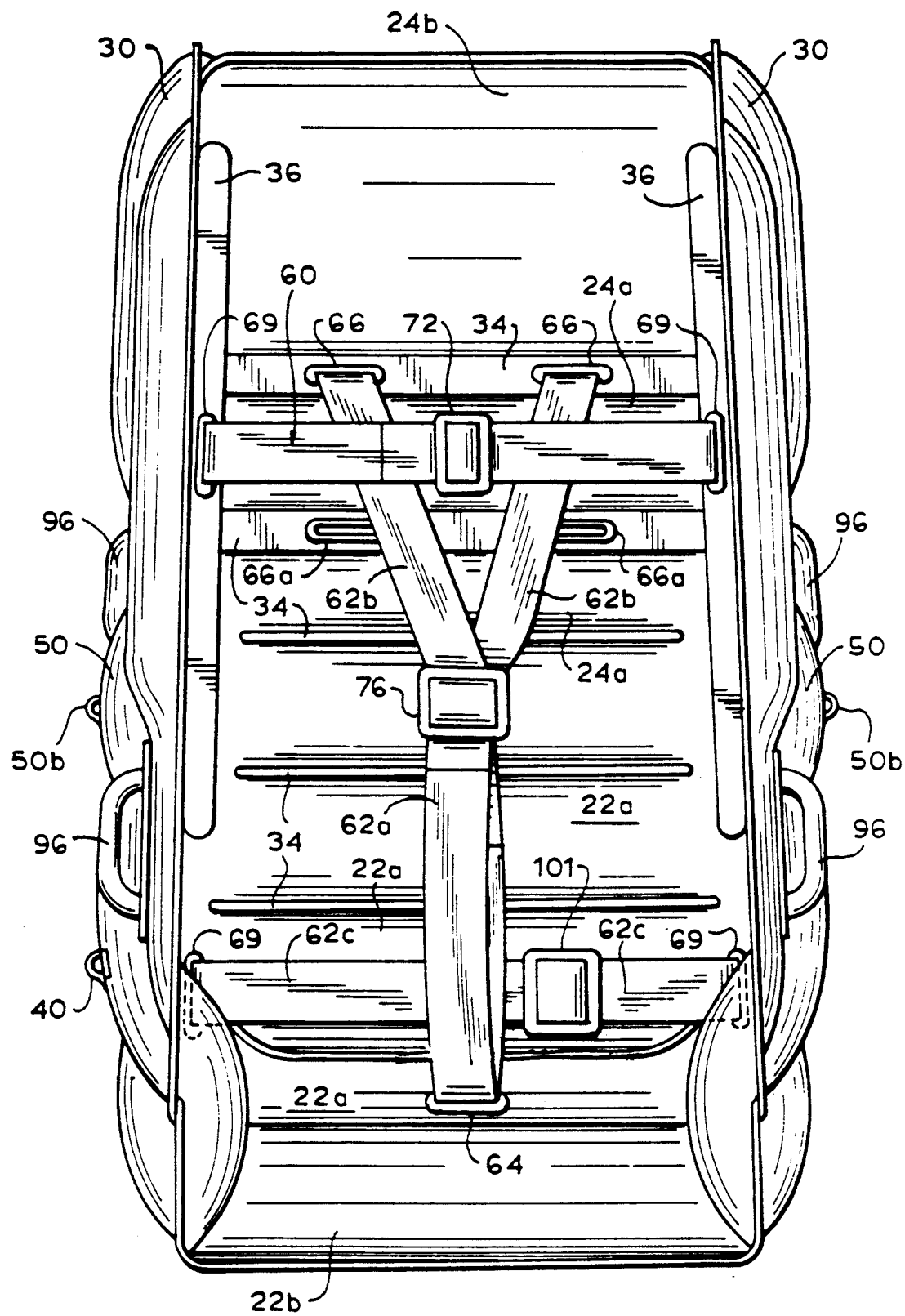
Figure 4:
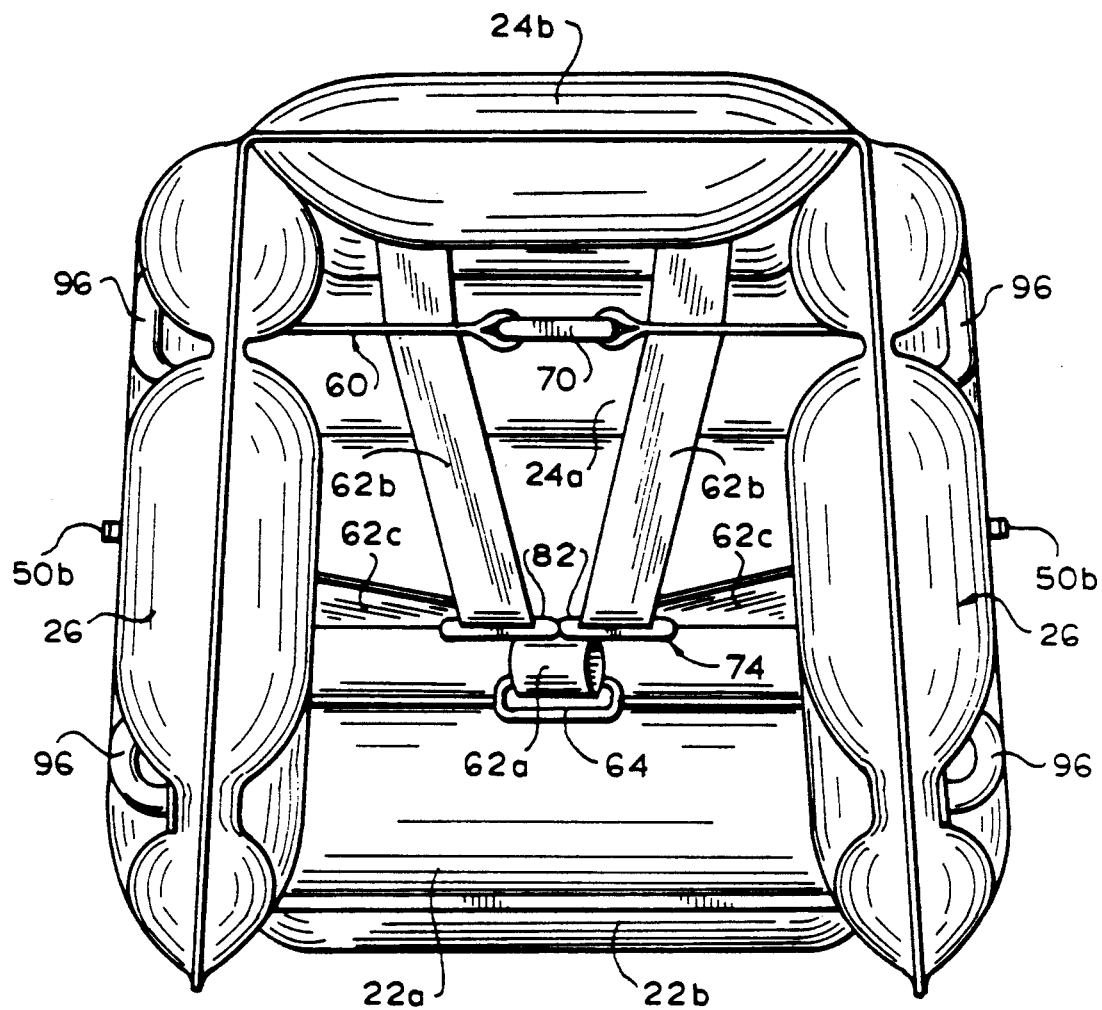
FIGS. 4 and 5 are front elevational and rear elevational views thereof, respectively.
Figure 5:
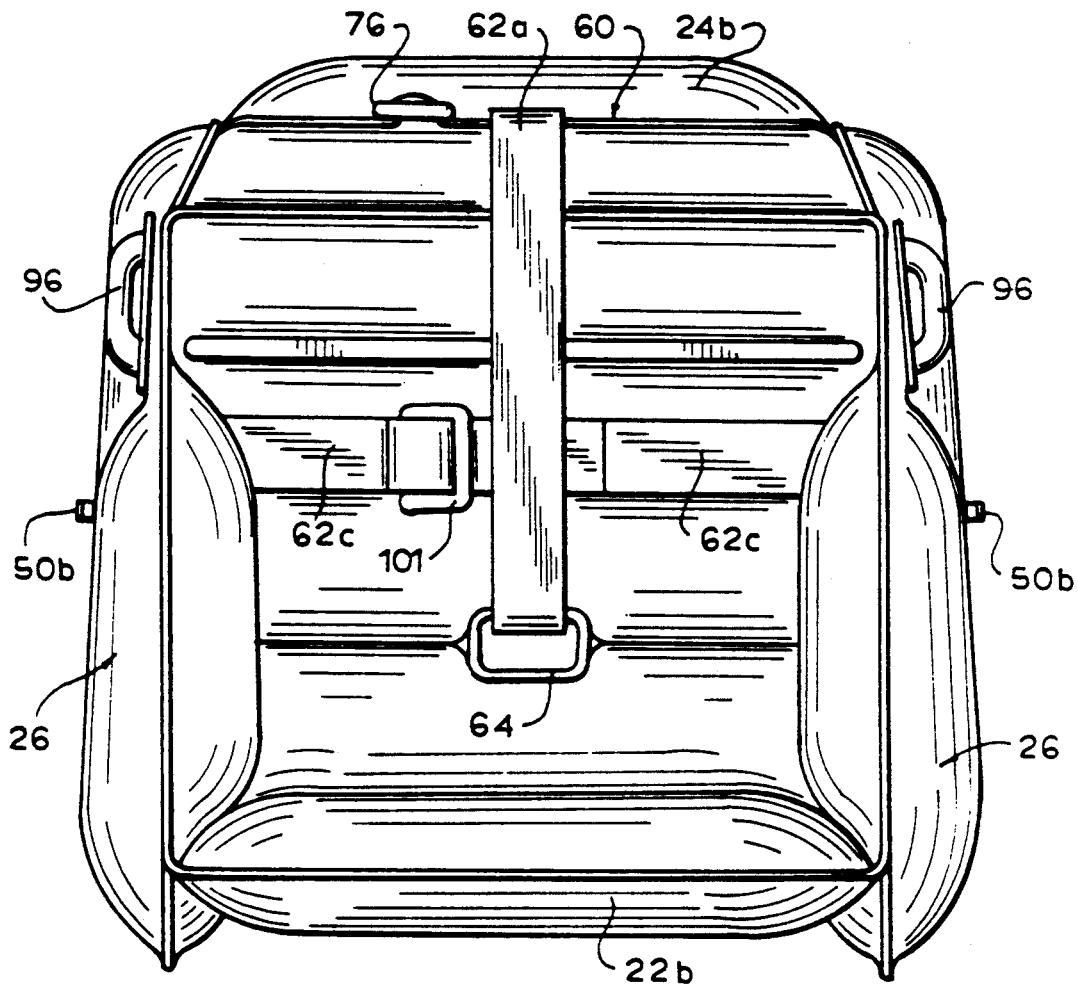

In order to maintain the child within the child seat 20, both against the natural inclination of a child to wander out of any seat and against the inertial forces acting to drive the child out of the seat during an abrupt stop of the vehicle, a releasable harness means is provided for maintaining the torso of the child within the seat 20 and more particularly between the sidewall panels 26 thereof. The continuous harness system used for this purpose includes first releasable strap means, generally designated 60, for maintaining the upper torso of the child in the inflatable child seat intermediate the back sidewall portions 30, and second releasable strap means, generally designated 62, for maintaining the lower torso of the child intermediate the bottom sidewall portions 32. To this end, the bottom panel 22 defines a bottom panel aperture 64 therethrough and the back panel 24 defines at least one, and preferably two, horizontally spaced back panel apertures 66 therethrough. Thus, the second strap means 62 extends behind the seat 20 between the bottom panel aperture 64 and the back panel apertures 66, as best seen in FIGS. 1 and 3, and from the bottom panel aperture 64, in front of the seat intermediate the legs of the child and over its shoulders to the back panel apertures 66, as best seen in FIGS. 2 and 4.

Additionally, each weld line 36 between a sidewall panel 26 and the bottom and back panels 22, 24 is interrupted to define two slots or passageways 69, one slot 69 intermediate the bottom panel 22 and the bottom sidewall portion 32 and one slot 69 intermediate the back panel 24 and the back sidewall portion 30. These slots 69 enable passage of a strap means 60, 62 therethrough and act to maintain each of the strap means in the desired orientation.

More particularly, the first strap means 60 extends in a horizontal plane about the back panel 24, passing through slots 69 intermediate the back panel 24 and the back sidewall panels 30, thereby to encircle the upper torso of a child in this seat 20. A first fixture means 70, such as a conventional, releasable fastener or buckle 70, is provided for releasably fastening the two functional end portions of the first strap means 60 together across the chest of the child. The physical ends of the first strap means 60 are typically secured to a conventional length-adjusting mechanism 72 (as illustrated in FIG. 3).

A second fixture means, generally designated 74, is provided for releasably fastening the two functional end portions of the second strap means 62 together between the legs of the child. Each of the releasable fixture means 70, 74 typically contains a simple release button or like mechanism which, when depressed, squeezed or otherwise activated, releases the intercoupled portions of the fixture means. The physical ends of the second strap means 62 are typically secured together by a conventional length-adjusting mechanism 76 (as illustrated in FIG. 3). The second fixture means 74 is illustrated as including a female member 80 associated with one functional end portion of the second strap means 62 and configured and dimensioned to receive and engage two separate male portions 82 associated with the other functional end portion of the second strap means 62. The female member 80 is engaged by a portion 62a of the second strap means 62 passing intermediate the legs of the child, while the male members 82 are each engaged by one of the shoulder portions 62b of the second strap means 62 descending from the back panel apertures 66 downwardly over the chest of the child.

The path of the second strap means 62 extends at least in a vertical plane from the second fixture means 74 (and, in particular, the female member 80 thereof) downwardly through the bottom panel aperture 64 and then, after passing upwardly behind the seat 20, forwardly through the two back panel apertures 66 and then downwardly and inwardly through the male members 82 of buckle 74. Typically, as illustrated, the second strap means 62 includes two overlapping lengths 62a thereof which overlap in the regions in front of the seat between the female member 84 and the bottom panel aperture 64 and behind the seat from the bottom panel aperture 64 to the length-adjusting mechanism 76 (see FIGS. 2 and 3) and two divergent or substantially non-overlapping lengths 62b which extend behind the seat upwardly from the length-adjusting mechanism 76 through their respective back panel apertures 66 and then downwardly in front of the seat from their respective back panel apertures 66 to where they engage the male members 82 of buckle 74.

The male members 82 of buckle 74 may be fixedly engaged to the second strap lengths 62b and the harness 62 will adequately perform its function. However, in the preferred embodiment of the present invention illustrated, the lengths 62b extend slidably through the male members 82 of buckle 74 to form a portion 62c of the second strap means 62, which portion 62c extends vertically about the bottom panel 22. More particularly, the second strap means portion 62c extends downwardly and outwardly from one male member 82, passes outwardly through one slot 69 intermediate the bottom panel 22 and the bottom sidewall panel 32, extends across the bottom panel 22 under the seat 20, passes inwardly through the other slot 69, and then through the other male member 82, thereby to further assist in maintaining the lower torso of the child intermediate the sidewall panels 26. The two ends of the second strap means portion 62c are preferably slidable relative to the male members 82 of buckle 74, but alternatively may be fixedly secured thereto, if desired.

The first and second strap means 60, 62 are fixably secured together (e.g., by stitching, fasteners, or the like) at at least one point 92, and preferably two points 92, so that the strap means 60, 62 of the harness are continuous and the first harness 60 maintains a desirable spacing of the second strap lengths 62b over the front of the child s chest. The strap means 60, 62 are formed of a strong, flexible material such as reinforced fabric.

It will be appreciated that the overall lengths of the first and second strap means 60, 62 are independently adjustable by means of their respective length-adjusting mechanisms 72, 76. To provide for further flexibility, however, in addition to the back panel apertures 66 already described, an additional pair of back panel apertures 66a may be provided below the apertures 66 so that the second strap means 62 may be passed through the second pair of back panel apertures 66a for a smaller child, the slack thus created in second strap means 62 being taken up by means of the length-adjusting mechanism 76.

Referring now to FIG. 6, therein illustrated is the device 10 in a position of use on a vehicle seat with the bottom panel 22 resting on the seat bottom cushion 14 and the back panel 24 resting on the seat back cushion 16. A child C (illustrated in phantom line) is disposed within the seat 20, and a conventional seat belt 12 secures the device 10 to the vehicle seat (or vehicle frame). Secured to each sidewall panel 26, and as illustrated the outer surface of each intermediate sidewall panel portion 26a, are upper and lower passageways 96, one disposed above and forward of the bracing means 50 and one disposed below and behind the bracing means 50. These passageways 96 are formed of a relatively hard non-inflatable material and are configured and dimensioned to allow passage therethrough of one end of a seatbelt 12 so that the seatbelt end may be passed through the lower and then upper passageways 96 of one side panel 26, passed in front of the stomach of the child, threaded through the upper and then lower passageways 96 of the other side panel 26, and then secured to the other end of the seatbelt 12 by a conventional seatbelt buckle 98, thereby to secure the device 10 to the vehicle seat. The passageways 96 also serve as convenient handles which enable the device 10 to be transported from one location to another—for example, from a house to the vehicle.

When the vehicle comes to an abrupt stop, inertia causes the device 10 to continue to move in the prior direction of motion of the vehicle (typically, forwardly). This has the same effect as if the seatbelt 12 were suddenly tightened. As the portions 26a of the sidewall panels disposed intermediate the bracing means 50 and the seatbelt 12 are more flexible than the bracing means 50, the tightening seatbelt 12 will cause the aforementioned upper intermediate sidewall portions 26a to fold inwardly and downwardly towards each other so that they will more closely cradle and now also cover the child C within the seat, thereby to briefly limit its movement and shield it from flying glass and like debris during the instant of the accident, even though the child's comfort may briefly suffer due to the closer restraints.

Figure 7:
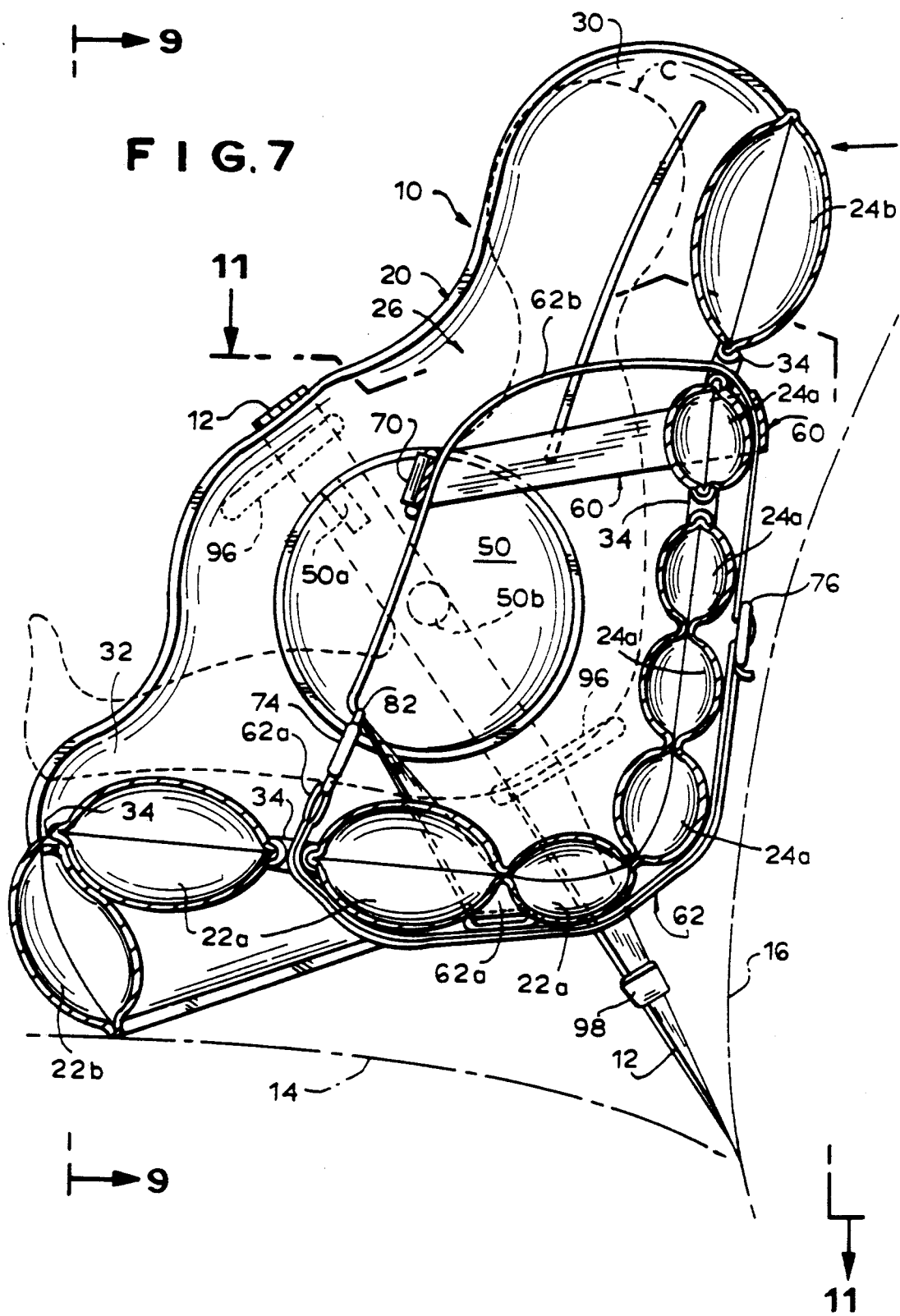
FIG. 7 is a view similar to FIG. 6, but showing the device and child during an abrupt stop of the vehicle.
Figure 8:
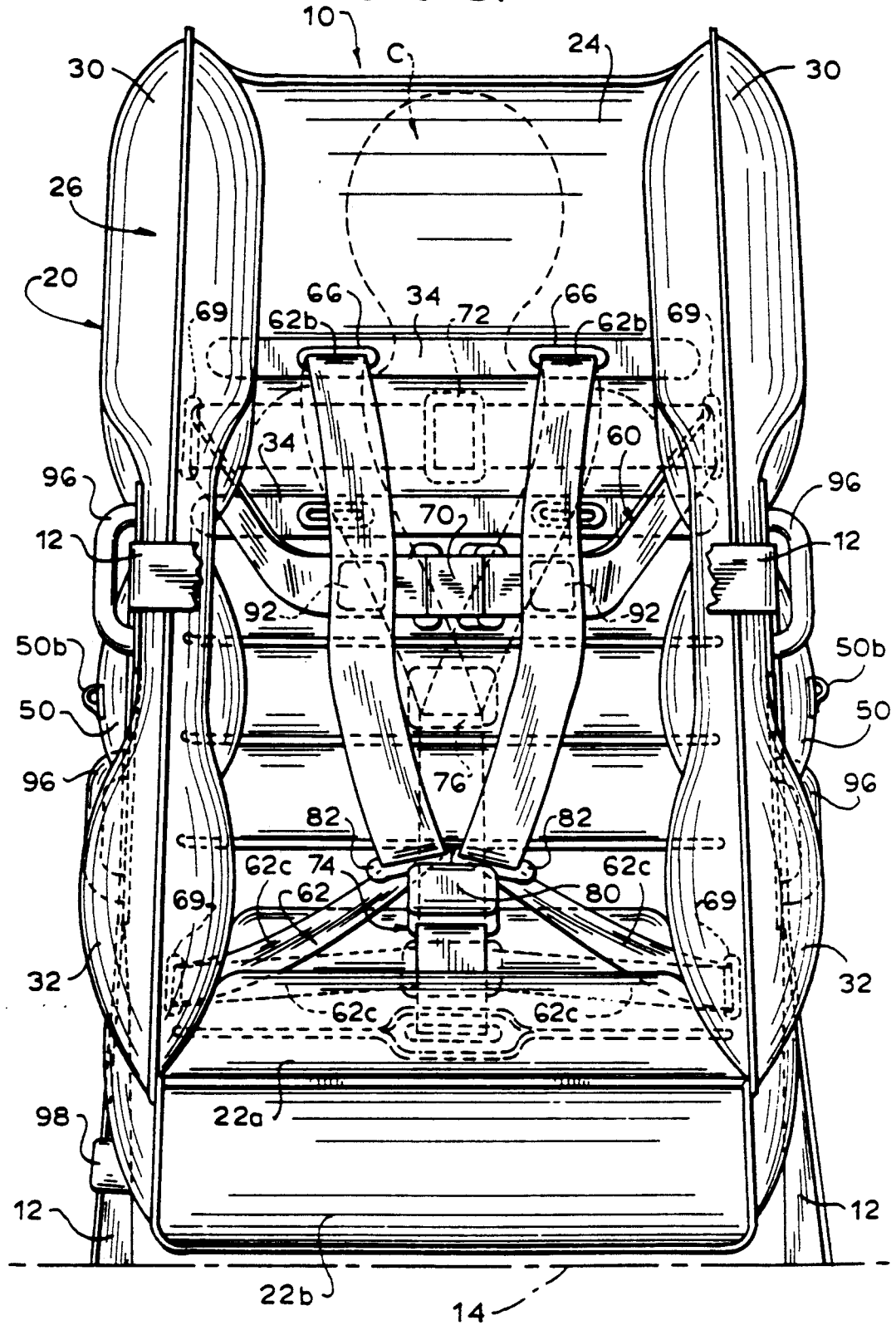
FIG. 8 is a top plan view taken along the line 8—8 of FIG. 6, with a portion of the seatbelt being cut away to reveal details of internal construction.
Figure 9:
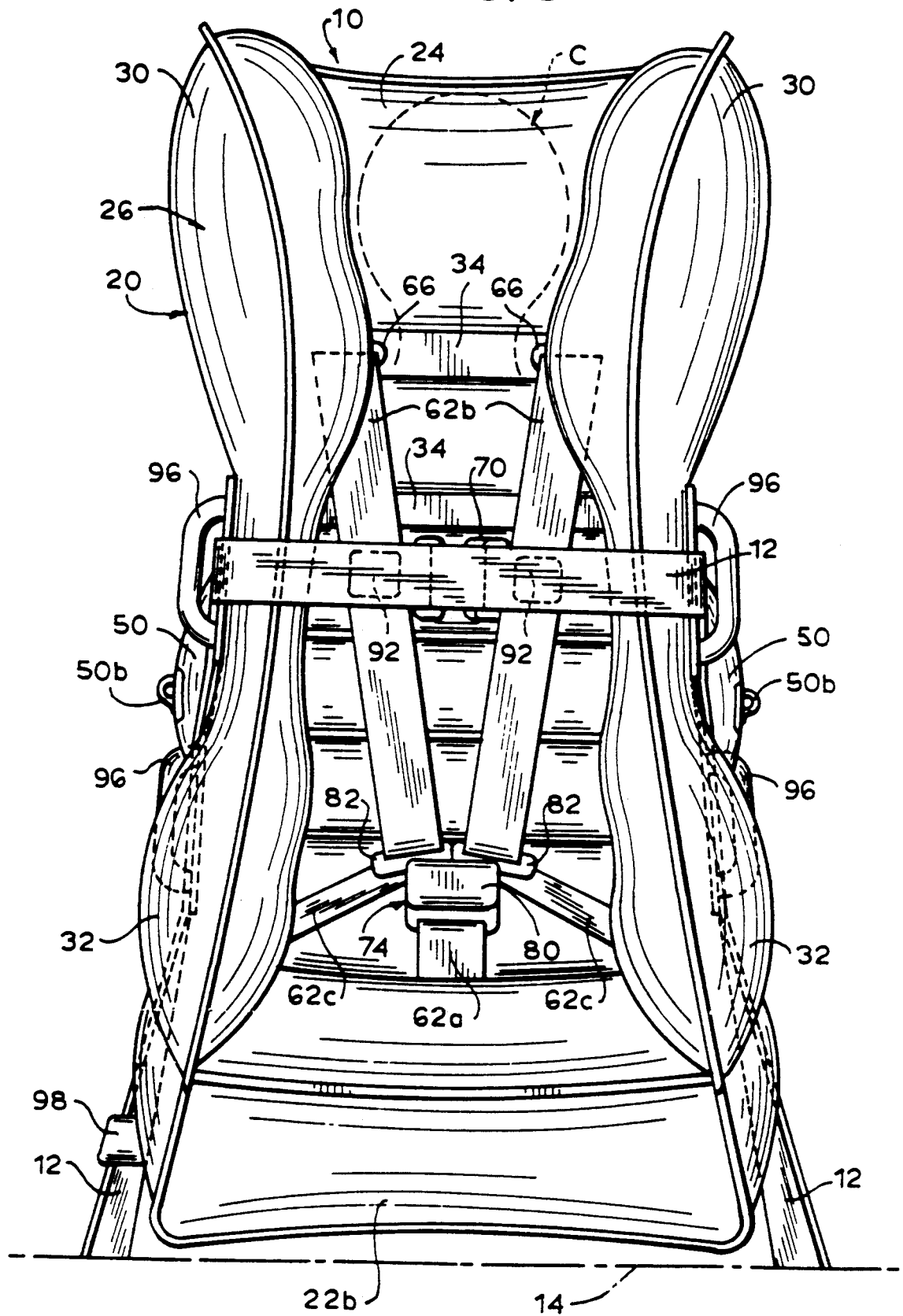
FIG. 9 is a top plan view taken along the line 9—9 of FIG. 7, similar to FIG. 8 but showing the device and child during an abrupt stop.
Figure 11:
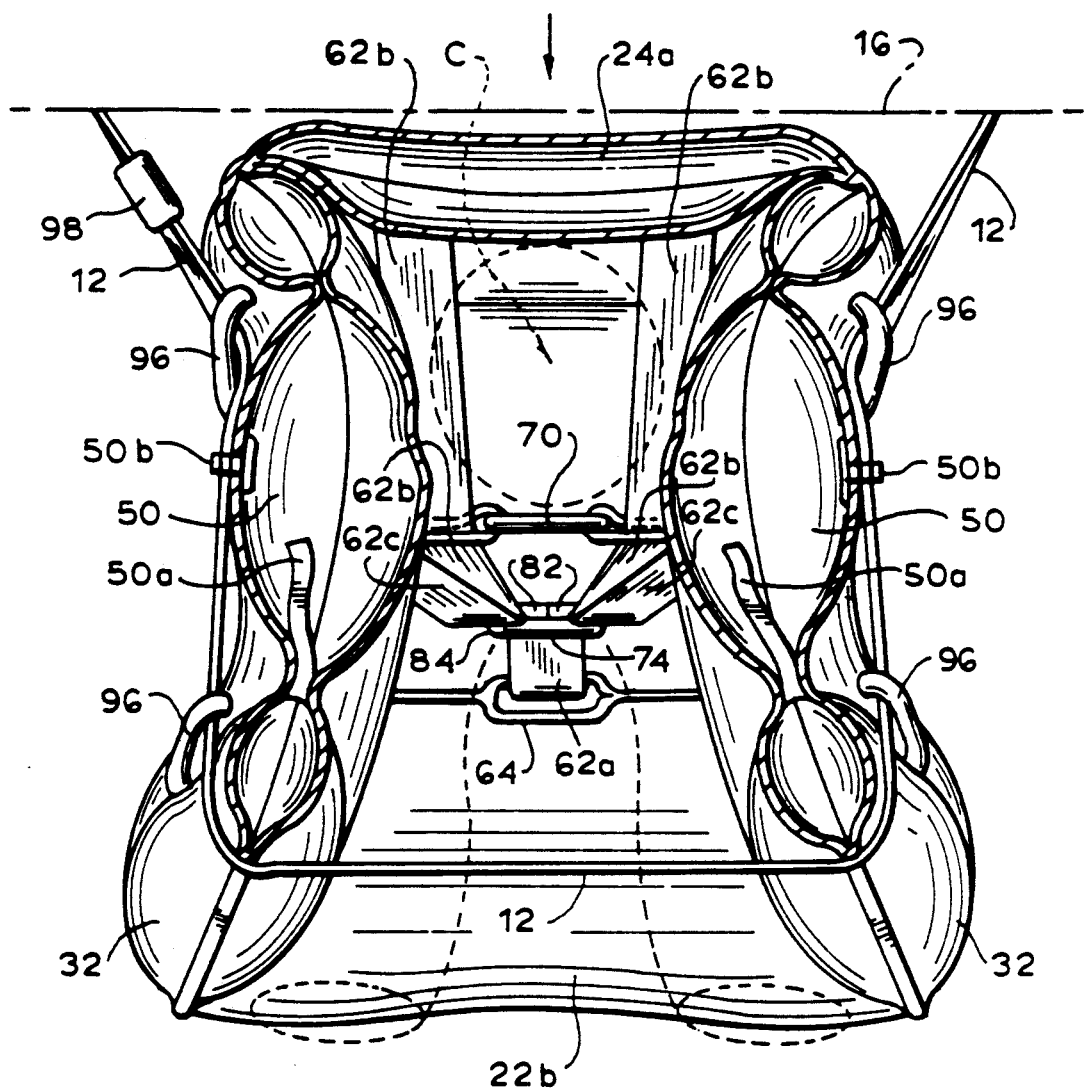
FIG. 11 is a sectional view taken along the line 11—11 of FIG. 7, similar to FIG. 10 but showing the device and child during an abrupt stop.

Referring now to FIGS. 6, 8 and 10, therein illustrated is the device 10 in normal use. By way of contrast, FIGS. 7, 9 and 11 are similar views illustrating the device 10 during an abrupt stop in the forward motion of the vehicle (as might occur during a head-on collision). Relative to FIGS. 6, 8 and 10, FIGS. 7, 9 and 11 show the upper portion of back panel 24 moving away from the back cushion seat 16 and somewhat forwardly and downwardly toward the bottom panel 22. Such motion, especially such motion of the lower portion of back panel 24, is limited by the presence of the bracing means 50 within each sidewall panel 26. Furthermore, the upper connecting sidewall portion 26a of each sidewall panel 26, under and adjacent to the seatbelt 12, as well as adjacent portions of the back and bottom sidewall portions 30, 32, buckle somewhat and are drawn inwardly towards the other by the seatbelt 12 to further limit movement of the child within under the inertial forces of the abrupt stop and to further cushion and protect the child from flying glass, debris and the like.

If desired, a length adjusting mechanism 101 may be provided for the second strap means portion 62c just as the mechanisms 72 and 76 are provided for the first strap means 60 and the second strap means portions 62a, 62b.

The device 10 is simple to use. To inflate the seat 20, air is introduced under pressure via valve 40, either by blowing into it or by using hand, foot or electrically operated pumps. Inflation is completed when the ends of the bracing means 50 reach the convexly rounded shape illustrated in FIG. 2 as a result of the air introduced through valve 40 eventually passing through the collapsible valve 50a. Alternatively, where the embodiment lacks the collapsible valve 50a and utilizes a two-way inflation/deflation valve for the bracing means 50, the inflation/deflation valves may be used to inflate the bracing means 50.

Once inflated, the device 10 may be transported to a car using the upper passageways 96 as handles for carrying the same. Once in the car, the first and second fixture means or buckles 70, 74 are activated to release the various portions thereof. After the child is placed within the inflated seat 20, the first strap means 60 is secured about the chest of the child, with the functional end portions thereof being secured by the first buckle 70. The second strap means portion 62a is disposed between the legs of the child, and the second strap means portions 62b are disposed over the shoulders of the child, and the second strap means portions 62c are disposed over the thighs of the child. The various members 80, 82 of the second buckle 74 are then secured together. This procedure insures that the child will be maintained within the device 10, and more particularly intermediate the sidewall portions 26 thereof, even in the event of an accident. Finally, one end of seatbelt 12 is threaded through the lower and then upper passageways 96 of one sidewall panel 26, passed in front of the stomach of the child, threaded through the upper and then lower passageways 96 of the other sidewall panel 26, and then secured to the other end of the seatbelt 12 by the seatbelt buckle 98.

When the device 10 is not in use, it may be easily deflated using the one-way deflation-only valves 50b (or the two-way bracing means valves, if present) to deflate the bracing means 50 and the two-way inflation/deflation valves 40 to deflate the remaining portions of the inflated seat 20. Deflation may be accomplished by manual squeezing of the parts involved or by the use in reverse of any of the pump-like mechanisms described in connection with the inflation process, i.e., as deflation pumps.

While the inflatable portions of the seat may be formed of nylon or other material affording sufficient strength and gaseous impermeability to meet rigorous safety standards, the upper surface of the bottom panel 22 and the inner surface of the sidewall panels 26 above the bottom panel 22 may be padded or lined with a material which will afford greater comfort to the child within the seat than nylon or plastic by itself. For example, the lining may be formed of a soft, breathable fabric.

Figure 12:
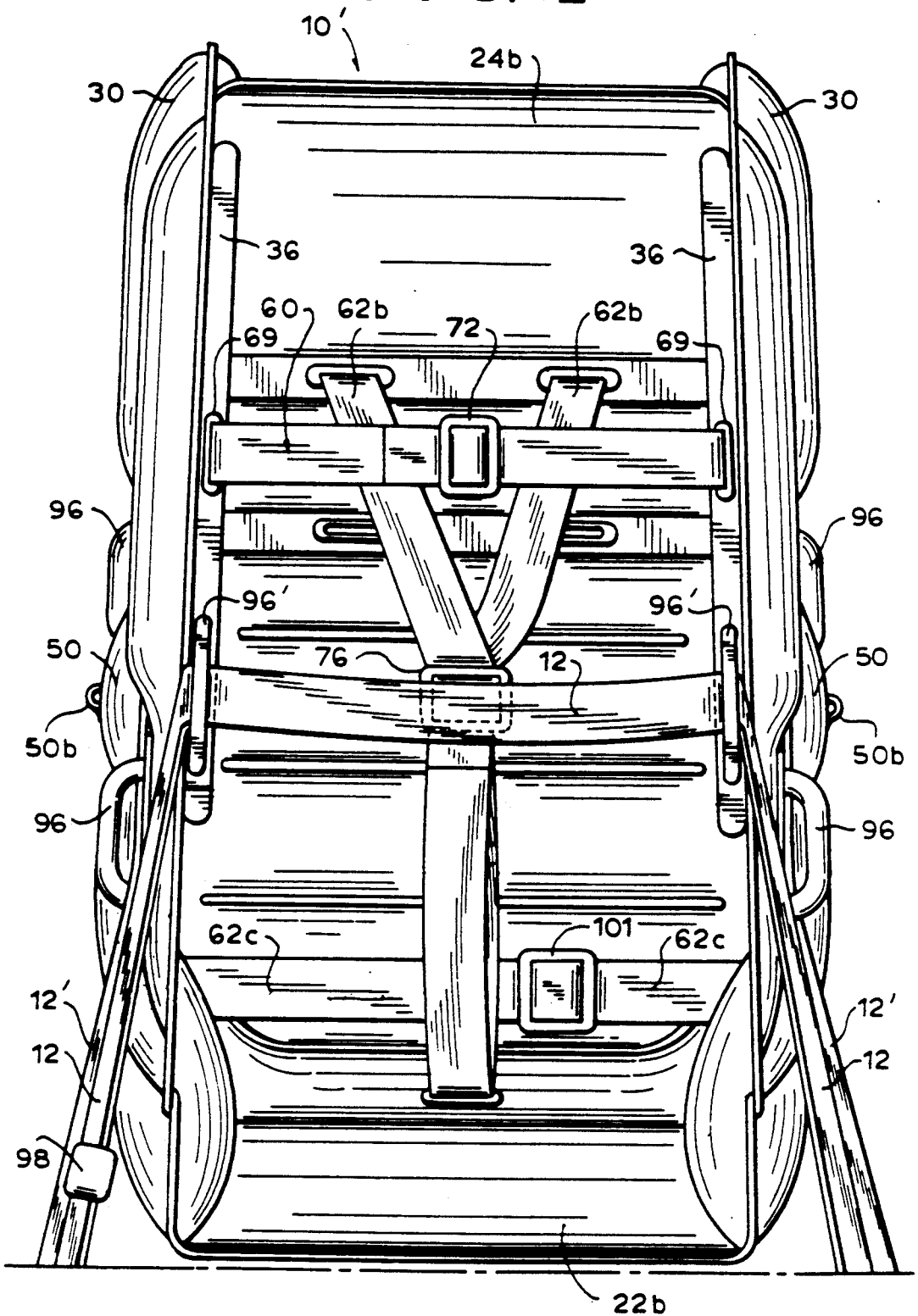
FIG. 12 is a rear elevational view of an alternative embodiment.

Referring now to FIG. 12, an alternative embodiment 10' of the device is intended to be relatively permanently installed in a vehicle. It is similar to the first embodiment 10, except that it incorporates auxiliary passageways 96 projecting outwardly and rearwardly from each sidewall panel 26 or opposite sides of the back panel 24. One end of a normal seatbelt 12 would be passed through the auxiliary passageways 96' and secured to the other seatbelt end by the seatbelt buckle 98, thereby to relatively permanently secure the device 10' to the vehicle seat. Both parts of an auxiliary seatbelt 12' are secured to the main seat belt 12 or vehicle seat (or frame) and then one end is threaded through the main passageways 96 and joined with the other auxiliary seatbelt end by the buckle of the auxiliary seatbelt 12'. This permits the device 10' to remain in position on the vehicle seat regardless of whether or not the auxiliary seatbelt 12' has been left open when not in use by the child.

To summarize, the present invention provides a child vehicle seat device which, under normal driving conditions, provides the maximum level of comfort to the child within, yet affords a maximum level of protection for the child within, regardless of its comfort, during the instant of the accident. The device is lightweight, easily and compactly stored when not in use, economical to manufacture, and easy to maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A child seat device for use in a vehicle having a seatbelt for securing the child seat device to the vehicle seat, comprising:
   (A) an inflatable child seat including
      (i) an inflatable bottom panel;
      (ii) an inflatable back panel upstanding from the rear of said bottom panel;
      (iii) a pair of opposed, laterally spaced inflatable sidewall panels, each of said sidewall panels having a back portion projecting forwardly from a respective side of said back panel and a bottom portion projecting upwardly from a respective side of said bottom panel; and
      (iv) an inflatable bracing means, disposed in each of said sidewall panels intermediate said back and bottom sidewall portions and spaced from both said bottom panel and said back panel, for limiting pivotal movement of said back and bottom sidewall portions towards each other; and
   (b) releasable harness means for maintaining the torso of a child intermediate said sidewall panels.

2. The child seat device of claim 1 wherein each of said bracing means is inflatable and defines a single interior air chamber having at most limited gaseous communication with said bottom, back and sidewall panels.

3. The child seat device of claim 1, wherein at least an upper portion of said back panel is forcibly pivotable downward and forward.

4. The child seat device of claim 1 wherein said bracing means limit pivotal movement of said back and bottom panels toward each other.

5. The child seat device of claim 2 wherein said bottom, back and sidewall panels define a single interior panel air chamber.

6. A child seat device for use in a vehicle having a seatbelt for securing the child seat device to the vehicle seat, comprising:
   (A) an inflatable child seat including
      (i) an inflatable bottom panel;
      (ii) an inflatable back panel upstanding from the rear of said bottom panel;
      (iii) a pair of opposed, laterally spaced inflatable sidewall panels, each of said sidewall panels having a back portion projecting forwardly from a respective side of said back panel and a bottom portion projecting upwardly from a respective side of said bottom panel; and (iv) an inflatable bracing means, disposed in each of said sidewall panels intermediate said back and bottom sidewall panels intermediate said back and bottom sidewall portions, for limiting pivotal movement of said back and bottom sidewall portions towards each other, each of said bracing means being inflatable and defining a single interior air chamber having at most limited gaseous communication with said bottom, back and sidewall panels; and (B) releasable harness means for maintaining the torso of a child intermediate said sidewall panels;

said bottom, back and sidewall panels defining a single interior panel air chamber, and each of said bracing means air chambers, once inflated, being independent of said panel air chamber.

7. The child seat device of claim 2 wherein said bottom, back and sidewall panels and said bracing means are commonly inflatable.

8. A child seat device for use in a vehicle having a seatbelt for securing the child seat device to the vehicle seat, comprising:

(A) an inflatable child seat including
 (i) an inflatable bottom panel;
 (ii) an inflatable back panel upstanding from the rear of said bottom panel;
 (iii) a pair of opposed, laterally spaced inflatable sidewall panels, each of said sidewall panels having a back portion projecting forwardly from a respective side of said back panel and a bottom portion projecting upwardly from a respective side of said bottom panel; and
 (iv) an inflatable bracing means, disposed in each of said sidewall panels intermediate said back and bottom sidewall panels intermediate said back and bottom sidewall portions, for limiting pivotal movement of said back and bottom sidewall portions towards each other, each of said bracing means being inflatable and defining a single interior air chamber having at most limited gaseous communication with said bottom, back and sidewall panels; and (B) releasable harness means for maintaining the torso of a child intermediate said sidewall panels;

said bottom, back and sidewall panels and said bracing means being commonly inflatable, said bottom, back and sidewall panels being commonly deflatable, and said bracing means being inflatable independently of each other and said panels.

9. A child seat device for use in a vehicle having a seatbelt for securing the child seat device to the vehicle seat, comprising:

(A) an inflatable child seat including
 (i) an inflatable bottom panel;
 (ii) an inflatable back panel upstanding from the rear of said bottom panel;
 (iii) a pair of opposed, laterally spaced inflatable sidewall panels, each of said sidewall panels having a back portion projecting forwardly from a respective side of said back panel and a bottom portion projecting upwardly from a respective side of said bottom panel, at least an upper portion of said back panel being forcibly pivotable downward and forward;

(iv) an inflatable bracing means, disposed in each of said sidewall panels intermediate said back and bottom sidewall portions, for limiting pivotal movement of said back and bottom sidewall portions towards each other, each of said bracing means defining a single interior air chamber having at most limited gaseous communication with said bottom, back and sidewall panels, said bracing means limiting pivotal movement of said back and bottom panels towards each other;

said bottom, back and sidewall panels defining a single interior panel air chamber, and each of said bracing means air chambers, once inflated, being independent of said panel air chamber; said bottom, back and sidewall panels and said bracing means being commonly inflatable, said bottom, back and sidewall panels being commonly deflatable, and said bracing means being deflatable independently of each other and said panels; and (B) releasable harness means for maintaining the torso of a child intermediate said sidwall panels.

10. The child seat device of claim 1 wherein each of said bottom and back panels defines an aperture therethrough, and said harness means is a continuous harness system including:

(i) first releasable strap means for maintaining the upper torso of a child in said inflatable child seat intermediate said back sidewall portions; and
(ii) second releasable strap means extending through both said back panel aperture and said bottom panel aperture and passing intermediate the legs of the child for maintaining the lower torso of the child intermediate said bottom sidewall portions;

said first and second strap means being secured together at at least one point.

11. A child seat device for use in a vehicle having a seatbelt for securing the child seat device to the vehicle seat, comprising:

(A) an inflatable child seat including
 (i) an inflatable bottom panel defining an aperture therethrough;
 (ii) an inflatable back panel upstanding from the rear of said bottom panel and defining an aperture therethrough; and
 (iii) a pair of opposed, laterally spaced inflatable sidewall panels, each of said sidewall panels having a back portion projecting forwardly from a respective side of said back panel and a bottom portion projecting upwardly from a respective side of said bottom panel; and (B) a continuous harness system including
 (i) first releasable strap means for maintaining the upper torso of a child in said inflatable child seat intermediate said back sidewall portions; and
 (ii) second releasable strap means extending through both said back panel aperture and said bottom panel aperture and passing intermediate the legs of the child for maintaining the lower torso of the child intermediate said bottom sidewall portions;

said first and second strap means being secured together at at least one point.

12. The child seat device of claim 11 wherein said harness system includes:

(i) first strap means extending in a horizontal plane around said back panel intermediate said back and back sidewall panels, thereby to encircle the upper torso of a child in said inflatable child seat;

(ii) first fixture means for releasably fastening two portions of said first strap means together across the chest of the child;

(iii) second strap means; and (iv) second fixture means for releasably fastening two portions of said second strap means together between the legs of the child;

said second strap means extending at least in a vertical plane from said second fixture means downwardly through said bottom panel aperture, then forwardly through said at least one back panel aperture, and into said second fixture means, thereby to maintain the lower torso of the child in said inflatable child seat;

said first and second strap means being fixedly secured together at at least one point.

13. The child seat device of claim 11 wherein said second strap means extends from said second fixture means downwardly through said bottom panel aperture, rearwardly and around the intersection of said bottom and back panels, upwardly and then forwardly through said at least one back panel aperture, and downwardly into said second fixture means.

14. The child seat device of claim 11 wherein a portion of said second strap means extends vertically around said bottom panel and intermediate said bottom and bottom sidewall panels and through said second fixture means, thereby to assist in maintaining the lower torso of the child intermediate said sidewall panels.

15. The child seat device of claim 11 wherein said inflatable child seat additionally defines a plurality of passageways for passage therethrough of said first and second strap means, thereby to maintain each of said first and second strap means in the desired orientation.

16. The child seat device of claim 11 wherein said second strap means includes two lengths thereof extending from said second fixture means downwardly through said bottom panel aperture, then forwardly through said back panel aperture and downwardly into said second fixture means, each of said lengths of said second strap means being fixedly secured to a respective laterally spaced portion of said first strap means.

17. The child seat device of claim 11 wherein said first and second strap means are fixedly secured together in front of the chest of a child in said inflatable child seat.

18. The child seat device of claim 11 wherein each of said first and second strap means includes means for varying the effective length thereof independently of the other of said strap means.

19. The child seat device of claim 11 wherein each of said sidewall panels defines a passageway for passage therethrough of a vehicle seatbelt.

20. A child seat device for use in a vehicle having a seatbelt for securing the child seat device to the vehicle seat, comprising:

(A) an inflatable child seat including (i) an inflatable bottom panel defining an aperture therethrough;

(ii) an inflatable back panel upstanding from the rear of said bottom panel and defining an aperture therethrough;

(iii) a pair of opposed, laterally spaced inflatable sidewall panels, each of said sidewall panels having a back portion projecting forwardly from a respective side of said back panel and a bottom portion projecting upwardly from a respective side of said bottom panel, each of said sidewall panels defines a passageway for passage therethrough of a vehicle seatbelt; and (iv) a plurality of passageways for passage therethrough of strap means; and (B) a continuous harness system including (i) first strap means extending in a horizontal plane around said back panel intermediate said back and back sidewall panels, thereby to encircle the upper torso of a child in said inflatable child seat;

(ii) first fixture means for releasably fastening two portions of said first strap means together across the chest of the child;

(iii) second strap means; and (iv) second fixture means for releasably fastening two portions of said second strap means together between the legs of a child;

said second strap means extending at least in a vertical plane from said second fixture means downwardly through said bottom panel aperture, rearwardly and around the intersection of said bottom and back panels, upwardly and then forwardly through said at least one back panel aperture, and into said second fixture means, thereby to maintain the lower torso of the child in said inflatable child seat;

a portion of said second strap means extending vertically around said bottom panel and intermediate said bottom and bottom sidewall panels and through said second fixture means, thereby to assist in maintaining the lower torso of the child intermediate said sidewall panels;

said first and second strap means being fixedly secured together at at least one point in front of the chest of a child in said inflatable child seat, and passing through said strap means passageways to maintain said strap means in a desired orientation;

each of said first and second strap means including means for varying the effective length thereof independently of the other cf said strap means.

21. The child seat device of claim 20 wherein said second strap means includes two lengths thereof extending from said second fixture means downwardly through said bottom panel aperture, then forwardly through said back panel aperture and downwardly into said second fixture means, each of said lengths of said second strap means being fixedly secured to a respective laterally spaced portion of said first strap means.

* * * * *